W. JENCKES.

Spinning-Rings.

No. 6,628. Reissued Sept. 7, 1875.

Witnesses.

L. H. Latimer.

W. J. Pratt.

Inventor.

George Draper & William F. Draper
Assignees of Welcome Jenckes.

per Crosby & Gregory atty's.

N. PETERS, PHOTO-LITHOGRAPHER, WASHINGTON, D. C.

UNITED STATES PATENT OFFICE.

WELCOME JENCKES, OF MANCHESTER, NEW HAMPSHIRE, ASSIGNOR TO GEORGE DRAPER & SON.

IMPROVEMENT IN SPINNING-RINGS.

Specification forming part of Letters Patent No. 39,657, dated August 25, 1863; reissue No. 5,702, dated December 23, 1873; reissue No. 6,628, dated S ptember 7, 1875; application filed July 31, 1875.

*To all whom it may concern:*

Figure 1:
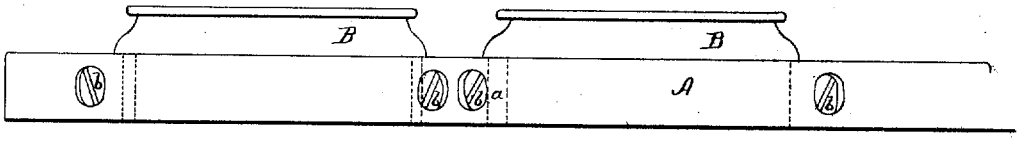
Figure 2:
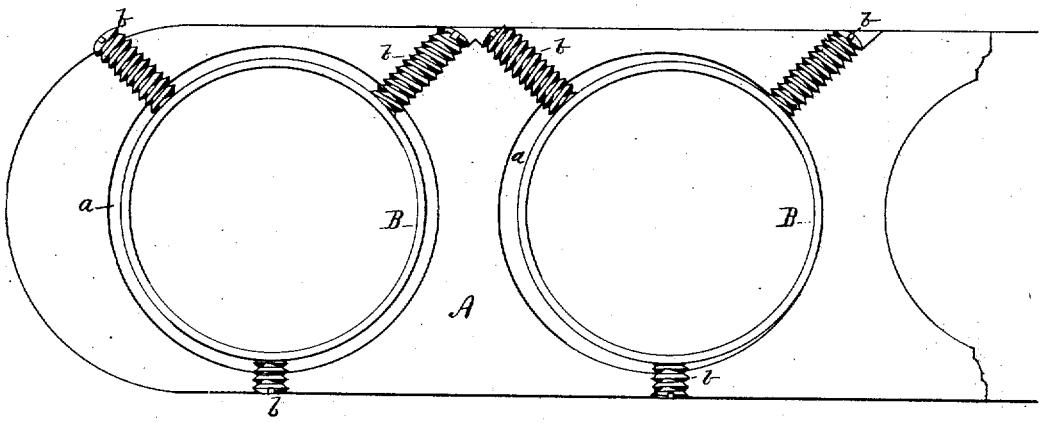

Be it known that I, WELCOME JENCKES, of Manchester, New Hampshire, have invented an Improvement in Spinning-Rings, of which the following is a specification:

Figure 1 is a front view of a portion of the ring-rail of a ring spinning-frame illustrating my improvement. Fig. 2 is a horizontal section of the same.

Similar letters of reference indicate corresponding parts in both the figures.

In all ring spinning-frames constructed prior to this invention, so far as known to me, in which the rings have been carried by or fitted into openings provided for them in the ring-rail, such rings have been held snugly in the rail without provision for adjusting them with relation to such spindle-openings.

The ring-rail is held in place by lifting-rods, which, when in use, work up and down in stationary guides provided for them in the frame, and, as the rods and guides may wear, the rings become eccentric to the spindles, and thereby cause great irregularity in the draft of the yarns in every revolution of the travelers and spindles, imperfect work being thereby produced.

The object of this invention is to provide for the adjustment of a spinning-ring carried by the ring-rail, and with relation to its socket in the said rail, to set the ring and race concentric with its spindle; and to this end the invention consists in the combination of a ring-rail, provided with a spindle-passage through it, with a ring and with means or mechanism whereby such ring carried by the ring-rail, on becoming eccentric to its spindle, may be moved or adjusted with reference to the spindle-passage in the rail, and be fixed in position concentric with the spindle. The invention also consists in a ring-rail having each of the sockets for the rings made larger in diameter than the neck or portion of the ring to enter it, and provided with adjusting-screws, arranged substantially in the manner specified.

A is the rail, and B B are two of its rings, with the races above the rail, these latter being of the usual construction. *a a* are the holes or sockets in the rails for the reception of the rings and the spindles, each of such holes being about one-eighth of an inch larger in diameter than the exterior of the neck or portion of the ring which is received within it. *b b b* are the adjusting-screws, of which it is proposed to use three for each ring, as a perfect adjustment cannot well be obtained with a less number. These screws are inserted from opposite sides of the rail, (two from one side and one from the other,) into threaded holes, provided in the rail for their reception, and are arranged radially to the axis of the ring-receiving aperture, and, as nearly as practicable, at equal distances apart around it. They should be screwed tightly enough against the ring to hold it in place.

When a ring requires adjustment, one or more of its respective screws are to be screwed outward, and the other or others screwed inward until the ring is brought concentric with its spindle, each ring being thus adjusted independently of each of the remainder of them.

I claim—

1. The combination of a ring-rail, provided with a passage through it for the spindle, with a ring and with adjusting mechanism, whereby such ring may be moved or adjusted with relation to the spindle-passage, and be placed concentric with the spindle, substantially as described.

2. A ring-rail having each of the sockets for the rings made larger in diameter than the neck or portion of the ring to enter it, in combination with rings and with adjusting mechanism, whereby the rings may be placed concentric with the spindle, substantially as specified.

3. The combination, with a ring-rail and a ring, of adjusting devices adapted to operate against different parts of the periphery of the ring to adjust the same concentric with the spindle, substantially as described.

In testimony whereof I have signed my name to this specification in the presence of two subscribing witnesses.

WELCOME JENCKES.

Witnesses:

JOHN P. BARTLETT,
ROLAND ROWELL.